Figure 3:
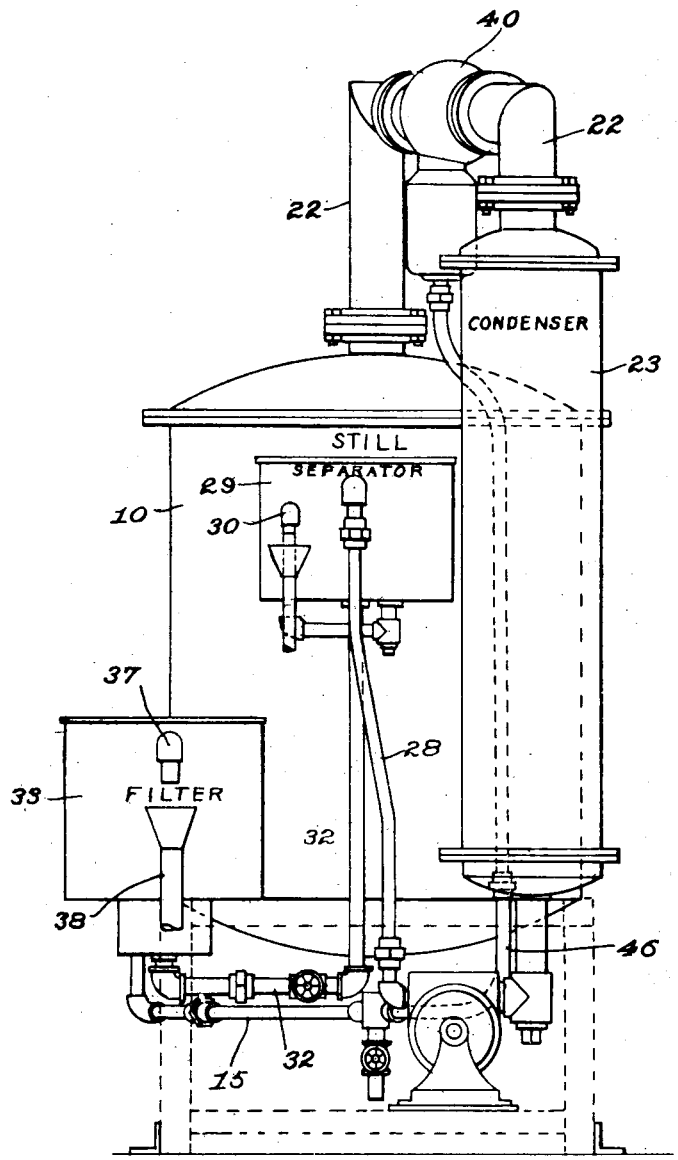

July 9, 1929.  C. MACLEOD  1,720,604
METHOD OF PURIFYING GASOLINE SOLVENT
Filed Sept. 22, 1927   2 Sheets-Sheet 1
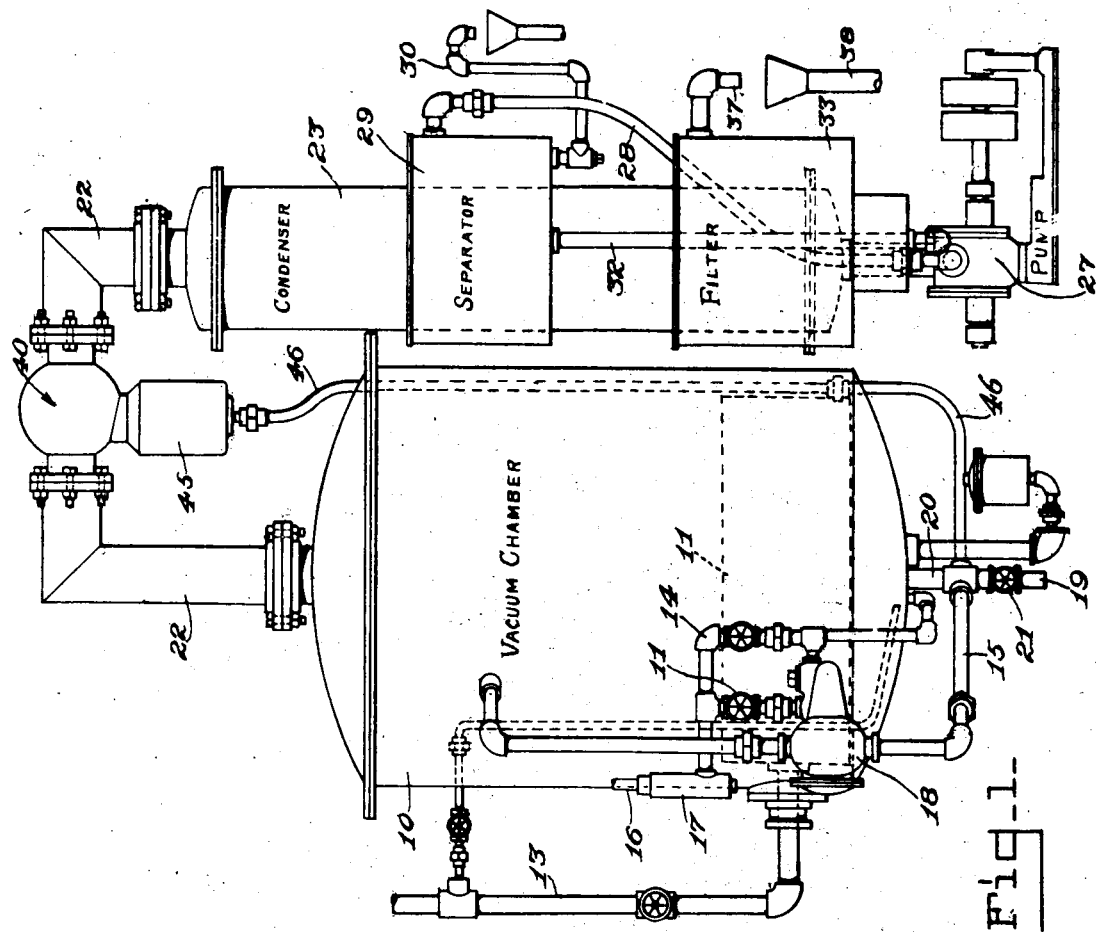

July 9, 1929. C. MACLEOD 1,720,604
METHOD OF PURIFYING GASOLINE SOLVENT
Filed Sept. 22, 1927 2 Sheets-Sheet 2

Patented July 9, 1929.

1,720,604

UNITED STATES PATENT OFFICE.

CAMERON MACLEOD, OF PHILADELPHIA, PENNSYLVANIA, ASSIGNOR TO BAEUERLE & MORRIS, INC., OF PHILADELPHIA, PENNSYLVANIA, A CORPORATION OF PENNSYLVANIA.

METHOD OF PURIFYING GASOLINE SOLVENT.

Application filed September 22, 1927. Serial No. 221,345.

This invention relates to the recovery or purification of so-called gasoline solvents, or high boiling point petroleum fractions used as substitutes for gasoline in dry cleaning and similar establishments, in accordance with the principles explained in an application filed January 25, 1927, by A. L. Dorfner, Serial No. 163,527.

In dry cleaning establishments, where clothes are cleaned by being immersed in a solvent, it is necessary to purify the solvent so that it can be used again. Two classes of solvents are commonly employed, first, the low boiling point solvents, such for instance as gasoline, and, second, the class of high boiling point solvents, such for instance as varnolene. Varnolene, according to the specification of the National Dry Cleaners' Association, is a petroleum fraction, free from aromatic hydrocarbons, with an initial boiling point between 300° and 310° F., a dry point between 400° and 410° F., and a flash point of not less than 105° F. My invention has to do with the purification of the second class of solvents and particularly those having the general characteristics of varnolene. The impurities contained in a high boiling point dry cleaner's solvent, after it has become dirty from use, are grease, animal, vegetable and mineral oils, particles of dirt, and, to a very large extent, soaps and alkaline substances, including ammonia, which have been employed in the cleaning process to remove the stains. Since this type of solvent has a high boiling point, it is not practical to purify it by distillation except under a relatively high vacuum, and the process must be performed in a closed apparatus or still. Large volumes of the solvent must be purified in very small spaces of time, but it is not practical to use apparatus of large size. The process must be practially a continuous one, and it is not practical to use apparatus which requires frequent cleaning, delicate adjustment, or highly skilled attendance. Furthermore, the purification must be practically perfect, and all the impurities of whatever character must be removed, so that the final product will be water-white and as good as the original fluid before it was used at all.

Various attempts have been made to accomplish these results, but, with the exception of methods based on the vacuum distillation principle, all such have failed to remove all of the impurities, and especially the mineral oils. On the other hand, all vacuum distillation methods of which I am aware have required large, expensive apparatus beyond the means of the ordinary dry cleaner's establishment, or have not been continuous in operation, but have required frequent cleaning, careful adjustment, and highly skilled attendance. Altogether such apparatus has not proved to be a commercial success in actual operation due to the fact that the method on which said apparatus operated did not take into proper consideration the peculiar effect of the special impurities contained in the fluid.

Early in the operation of high vacuum stills for purifying high boiling point dry cleaner's fluid it was found that they operated satisfactorily on some fluids but not on others, or would operate for a while on a particular fluid and suddenly cease to purify, but it was not understood what was the cause of this action nor how to remedy it. In fact, it was considered practically impossible to purify this fluid by distillation except with the use of apparatus which was excessively large and expensive in proportion to output.

My invention is based on the discovery that certain soaps employed by the cleaners form bubbles in the still, and that these bubbles are of a tenacious character which maintain their formation under practically all conditions. It was further found that when the still was operated below certain critical conditions of temperature and vacuum the formation of the bubbles did not occur rapidly enough to cause any trouble, but that if the temperature in the steam coils were raised, or if the vacuum were increased, in other words, if the capacity of the still were forced, there would be a discharge of dirty or black fluid from the apparatus and the apparatus would cease to function. Of course it is well understood that a discharge of this kind, even though small, is completely destructive of the work of the apparatus, and that unless the apparatus is delivering continuously perfectly purified fluid it is entirely useless.

Having discovered the cause of the intermittent action of the apparatus attempts vided with openings in which may be mounted the attaching means for the cables 17 and 18 respectively. Their rear ends are preferably provided with anti-friction wheels or rollers 31.

In the beam part 26 there is mounted a pin 32 similar to the pin 28, upon which are journaled an upper lever 33 and a lower lever 34, the lever 33 being at the same level as the lever 29 and adapted to engage the roller 31 thereof and the lever 34 being at the same level as the lever 30 and adapted to engage the roller 31 thereof. The surfaces upon the levers 33 and 34, which are adapted to engage the rollers 31 of the levers 29 and 30 respectively, are cams with reversely curved faces. The engaging face of lever 35 is such that when the forward end of lever 29 is positioned at a given angle A to the left of neutral, as shown in Fig. 2, the forward end of lever 33 will be positioned at a relatively small angle B to the left of neutral, but when the forward end of lever 29 is positioned at an angle A to the right of neutral, as shown in Fig. 4, the forward end of lever 33 will be positioned at angle C to the right of neutral, the angle C being greater than the angle B. In other words, the mutual effect of the levers upon each other is different when they move from neutral in one direction than when they move from neutral in the opposite direction. The engaging surface of the lever 34, however, is such that when the forward end of lever 30 is positioned at angle A to the left of neutral, as in Fig. 4, the forward end of lever 34 is at angle C to the left of neutral, while when lever 30 is at angle A to the right of neutral, as in Fig. 2, lever 34 is at angle B to the right of neutral. Hence the movement of lever 29 to the left swings lever 33 through the smaller angle while the movement of lever 30 to the left permits lever 34 to be swung through the larger angle. The opposite effects are true when the levers are swung toward the right.

On the side of the plane opposite that illustrated in Fig. 1, the levers are identical with those illustrated herein except that they are oppositely arranged, that is, they are symmetrical about the central vertical longitudinal plane of the machine, the upper lever 29 and the lower lever 30 being on the inboard side and the upper lever 33 and the lower lever 34 being on the outboard side. The levers 33 and 34 on each side of the plane are provided with openings 35 and 36 which are of correct size to receive the pins 27. Hence, when the wings are to be folded, the pins 27 are removed from the aligned openings in the beam parts 25 and 26 and are placed in the openings 35 and 36 and an opening in a portion 37 of each wing lying between the levers. Thus the wings are unlocked and the levers 33 and 34 are locked together and to the wing. On each side of the plane, the forward end of lever 33 is connected by a cable 38 with the upper extremity of mast 14, and the forward end of lever 34 is connected with the lower extremity of that mast by a cable 39, these cables passing over sheaves 40 and 41 respectively.

*Operation.*

Assume that the operator desires to tilt aileron 13 upwardly and the aileron on the other side of the machine in a reverse direction. The wheel 19 is turned so as to pull cable 17 to the left, as viewed in Fig. 1, or to the right as viewed in the remaining figures. The lever 29 then swings from neutral position, illustrated in Fig. 3, through a certain angle dependent upon the angle through which the wheel 19 is turned. Assume that this angle is the angle A, in other words, that lever 29 takes the position shown in Fig. 4. The lever 33, by virtue of its engagement with the lever 29, is swung in the same direction through an angle C. The cable 38 is thereby pulled and the aileron 13 tilted upwardly. This puts a pull upon cable 39 in the opposite direction and causes lever 34 to swing in a direction opposite to that of lever 33, but through the same angle C, as indicated in Fig. 4. Lever 30 is thereby swung through an angle A in a direction opposite to that of lever 29, thereby pulling upon cable 18 and moving that cable a distance equal to the movement of cable 17 but in the opposite direction.

On the opposite side of the airplane, the cable 18 swings its lever 30 through angle A and the lever 34 on that side through angle B. Angle B is smaller than angle C, and hence the pull upon the cable 39 on that side of the machine is less and the downward tilting of the aileron on that side is through a smaller angle than that through which the aileron 13 is upwardly tilted. The downward tilting of the unillustrated aileron produces an outward pull upon the cable 38 on that side, which pull is communicated through the levers 34 and 30 on that side swinging the lever 30 through angle A and thus communicating a pull to cable 16 in a direction to take up the slack which tends to form in cable 16 caused by the turning of the wheel 19, as previously described. The uptilting of one aileron is, therefore, greater than the down-tilting of the opposite aileron, this being desirable because of the fact that an aileron tilting downwardly through a given angle produces a greater drag than an aileron tilted upwardly through the same angle. The degree of differential action may be varied by the design of the levers, that which I prefer being 100%, that is, an uptilting twice that paratus of this type, I have found in practice that, if a sufficient steam pressure be maintained in the heating unit 11 for the efficient operation of the apparatus, the presence of certain soaps in the used solvent produces a tendency to form bubbles, which, remaining upon the surface of the liquid, mount up in and in the vacuum chamber, which bubbles eventually fill the portion of said chamber above the liquid therein and are drawn, by the high velocity imparted to the vaporized solvent by the pump 27, through the pipe 22 and into the condenser 23, carrying with them in suspension certain of the impurities which it is the object of the apparatus to remove. In accordance, therefore, with the present invention these bubbles, while travelling at high velocity from the vacuum chamber to the condenser, are subjected to centrifugal action to remove and precipitate the impurities carried in the walls thereof. To this end, in the construction shown, a centrifugal separator 40 is interposed in the pipe 22 between the vacuum chamber and the condenser. The separator 40, as shown in detail in Fig. 2, is preferably of the Swartwout type comprising a chamber 41 having an inlet 42 within which extends a spiral or helical baffle 43 and an outlet 44 extending into said chamber. The chamber 41 communicates at its bottom with a settling chamber 45 which, in turn, communicates through a pipe 46 with the pipe 20 and consequently with the bottom of the vacuum chamber 10.

In operation, the bubbles entering the inlet 42 are given a swirling movement by the baffle 43, are thrown toward the outer wall of the chamber 41, and are prevented from passing through the outlet 44 with the vapors, this operation serving effectually to break up the bubbles and to precipitate the heavier solid impurities and the heavier moisture which fall into the settling chamber 45 and are returned therefrom through the pipe 46 to the chamber 10. It will therefore be seen that the centrifugal separator acts not only to prevent siphoning of the liquid from the vacuum chamber and to remove any solid impurities which may be carried over from the latter, but also to remove some of the moisture from the vapor, thereby decreasing the work of the filter 33.

Having thus described my invention, I claim:—

1. The method of purifying by distillation a dirty high boiling point dry cleaner's solvent containing soaps and other impurities, which consists in rapidly vaporizing the solvent by boiling the same in a vacuum, and subjecting the vaporized solvent to centrifugal action, thereby removing the impurities contained in the walls of the bubbles formed in vaporizing the solvent and entrained in the vapors passing from the still.

2. The method of purifying by distillation a dirty high boiling point dry cleaner's solvent containing soaps and other impurities, which consists in rapidly vaporizing the solvent by boiling the same in a vacuum, removing the vaporized solvent from the boiling zone at high velocity, and, while said vaporized solvent is travelling at said high velocity, subjecting the same to centrifugal action induced by said velocity, thereby removing the impurities contained in the walls of the bubbles formed in vaporizing the solvent and entrained in the vapors passing from the still.

In testimony whereof I affix my signature.

CAMERON MACLEOD.